Aug. 29, 1961  C. L. SHARP  2,998,027
BALANCED VALVE
Filed Nov. 22, 1957

INVENTOR.
CHESTER L. SHARP
BY Jerry J. Dunlap
ATTORNEY 2,998,027
Patented Aug. 29, 1961

1

2,998,027
BALANCED VALVE
Chester L. Sharp, Tulsa, Okla., assignor, by mesne assignments, to National Tank Company, Tulsa, Okla., a corporation of Nevada
Filed Nov. 22, 1957, Ser. No. 698,265
2 Claims. (Cl. 137—625.36)

This invention relates generally to improvements in balanced valves, and more particularly, but not by way of limitation, to an improved valve seat assembly for balanced valves.

As it is well known in the art, balanced valves utilize two valve members or heads arranged to at least partially equalize the pressure resisting opening and closing of the valve. The valve members engage seats carried by walls or partitions in the valve body on opposite sides of the valve inlet to control flow of fluid through the valve. Heretofore, the valve seats have been either secured directly to the valve body partitions, as by welding or threaded connections, or secured in a perforated sleeve which in turn is rigidly secured to at least one of the partitions. As a result, special tools must be used in removing the valve seats. Also, the valve members or heads are usually carried by a stem depending from a bonnet secured on the top of the valve body. As a result, expansion or contraction of the valve body partitions varies the positions of the valve seats relative to the valve heads and the precise degree of opening of the valve cannot be ascertained by the position of the valve stem operator or actuator.

The present invention contemplates a novel balanced valve wherein the valve seats are carried by a perforated sleeve simply inserted in the valve body partitions, whereby the seats may be easily removed for repair or replacement without the use of special tools. The sleeve is suitably anchored in position in the valve body partitions, preferably by an extension on the bonnet, whereby the seats will be anchored by the same member supporting the valve stem to maintain a precise correlation between the degree of opening of the valve and the position of the valve stem actuator. This invention also contemplates a novel valve head assembly having seating rings with soft seating areas and providing a nearly precise balanced valve, yet the valve head assembly is inserted and removed as a unit.

An important object of this invention is to facilitate the repair and replacement of the working parts of balanced valves.

Another object of this invention is to permit removal of the valve seats of a balanced valve without the use of special tools.

A further object of this invention is to provide precise control over the degree of opening of balanced valves.

A still further object of this invention is to support the valve seats in a balanced valve with the same member which supports the valve stem.

Another object of this invention is to provide a simply constructed balanced valve which may be economically manufactured.

Other objects and advantages of the invention will be evident from the following detailed description, when read in conjunction with the accompanying drawings which illustrate my invention.

2

Figure 2:
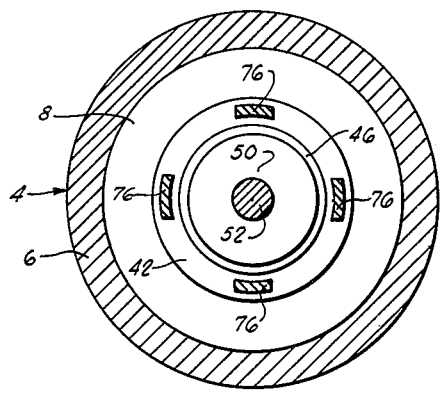
FIGURE 2 is a transverse sectional view of the valve, as taken along lines 2—2 of FIG. 1.

Referring to the drawings in detail, reference character 4 generally designates a balanced valve which includes a valve body 6 having a main valve chamber 8 therein. An outlet 10 is provided in the lower end of the body 6, and an inlet 12 is provided in one side of the body 6. Flanges 14 are provided around the outlet 10 and inlet 12 to facilitate connection of the body 6 in a flow line (not shown). It will be understood by those skilled in the art that the body 6 may be shaped and formed in any desired manner, in lieu of the flanges 14, to facilitate connection of the valve.

A large valve stem opening 16 is provided in the upper end of the body 6, and a flange 18 is formed around the opening 16 to receive a mating flange 20 on the lower end of a bonnet 22. The bonnet 22 is rigidly secured on the body 6 by a plurality of circumferentially spaced bolts 24 extending through apertures in the bonnet flange 20 and threaded into the body flange 18. A suitable sealing ring or gasket 26 is placed between the mating faces of the flanges 18 and 20 to provide a fluid tight joint between the body 6 and bonnet 22.

A pair of vertically spaced partitions or walls 28 and 29 extend partially across the main valve chamber 8 above and below the inlet 12 and are connected at their inner ends by a vertical partition 30 to separate the inlet 12 from the outlet 10 and provide a secondary valve chamber 32 in communication with the inlet 12. The partitions 28, 29 and 30 are ordinarily made of the same material as the body 6, and are preferably cast integrally with the body 6 to provide an economical construction. Aligned apertures 34 and 36, preferably of the same size, are provided in the upper and lower partitions, 28 and 29, in aligned relation with the valve stem opening 16 to receive a sleeve 38.

The sleeve 38 is of a length to extend vertically through the secondary valve chamber 32 and through both of the apertures 34 and 36, and is of a diameter to provide a relatively loose sliding fit thereof in the apertures 34 and 36. It should also be noted that the outer periphery of the sleve 38, particularly the portions thereof in the apertures 34 and 36, is smooth to facilitate insertion and removal of the sleeve. Suitable sealing rings 40, preferably O-rings, are provided in complementary grooves in the partitions 28 and 29 around each of the apertures 34 and 36 to seal the sleeve 38 to the partitions. The lower end of the sleeve 38 is preferably swaged inwardly, and the upper end of the sleeve is provided with an outwardly extending circumferential flange 42 for purposes which will be hereinafter set forth. The flange 42 is preferably formed integrally with the sleeve 38.

A plurality of circumferentially spaced transverse ports 44 are provided in the central portion of the sleeve 38 to provide substantially unrestricted communication between the interior of the sleeve and the inlet 12. Valve seats 46 and 48 are secured in the upper and lower end portions, respectively, of the sleeve 38 above and below the ports 44 to receive valve members or heads 50. The seats 46 and 48 are made of wear-resistant material, and may be secured in the sleeve 38 in any desired manner, but are preferably brazed to the sleeve in the proper positions. Also, the inner diameter of the upper seat 46 is slightly larger than the inner diameter of the lower seat 48.

Each head 50 is annular shaped, with the outer diameter of the lower head 50 being slightly less than the inner diameter of the upper seat 46, and both heads 50 are telescoped over the lower end portion of a vertically extending valve stem 52. A U-shaped guide 54 is apertured and telescoped over the valve stem 52 below each head 50 to enter the valve seats 46 and 48 and center the heads 50 with their respective seats. The guides 54 also help secure a pliable seating ring 55 in a complementary groove 55a in the lower end portion of each head 50.

Figure 3:
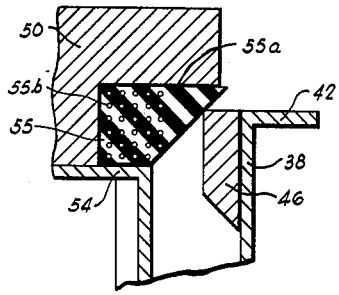
FIGURE 3 is an enlarged cross-sectional view illustrating the construction and assembly of the seating rings of the valve.
Figure 1:
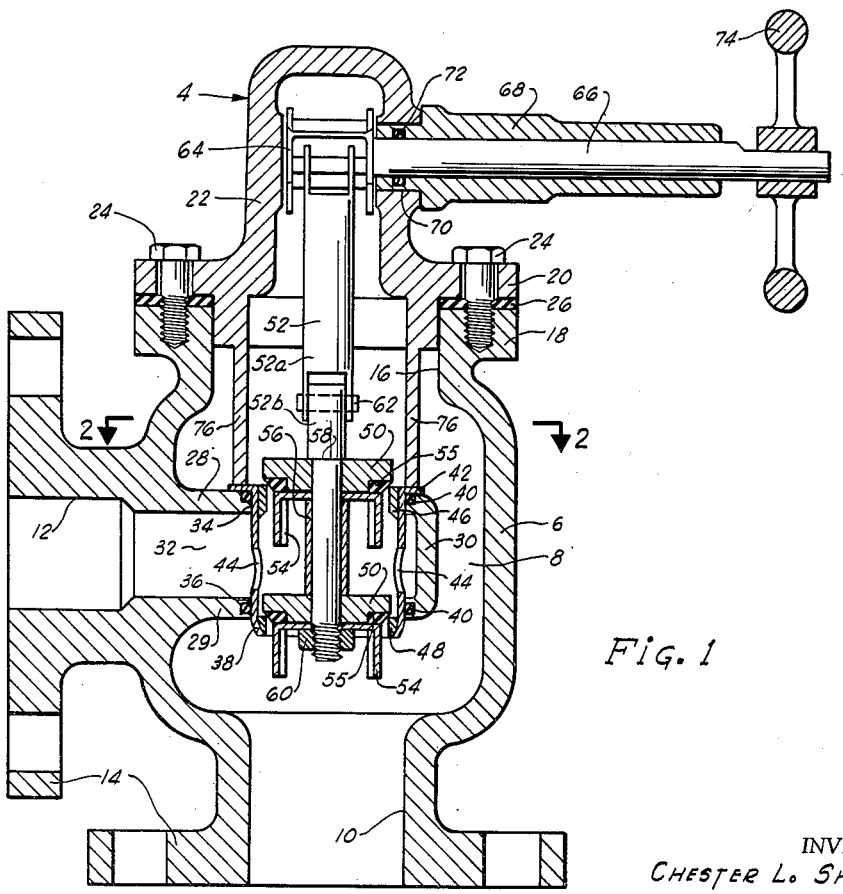
FIGURE 1 is a vertical sectional view of a balanced valve constructed in accordance with this invention.

As shown most clearly in FIG. 3, each ring 55 is formed out of a flexible, resilient material having a plurality of re-enforcing strands or cords 55b embedded in the portion of the ring positioned between the respective head 50 and guide 54. The cords 55b provide sufficient rigidity to the rings 55, such that the rings will be retained in the grooves 55a by the guides 54, yet the portions of the rings contacting the seats 46 and 48 will be soft to effectively seal against the seats, and the rings 55 may be wedged into the seats to take-up any possible difference in contraction or expansion of the sleeve 38 and stem 52. I prefer to form the rings 55 out of rubber, with nylon cords 55b in the form of strips of nylon cloth embedded therein, since nylon may be bonded in rubber and provides a strong re-enforcing material with a long service life. The outer periphery of each ring 55 is tapered to be wedged into its respective seat, and the largest outer diameter of the lower ring 55 should not be appreciably larger than the inner diameter of the upper seat 46, in order that the lower ring 55 may be forced through the upper seat upon assembling and disassembling the valve, as will be hereinafter described. Also, the largest outer diameter of each ring 55 (the upper end of each ring), and particularly the lower ring, should be larger than the outer diameter of the respective head 50 to facilitate contortion of the rings.

A spacer tube 56 is telescoped over the valve stem 52 between the upper guide 54 and the lower head 50 to retain the heads 50 the same distance apart as the seats 46 and 48. The lower end portion of the valve stem 52 which receives the heads 50 is reduced in diameter to form a downwardly facing shoulder 58. A nut 60 is threaded onto the lower end of the valve stem 52 to force the upper head 50 against the shoulder 58 and retain the heads 50, guides 54 and spacer tube 56 in assembly on the valve stem.

The valve stem 52 is formed in two sections, 52a and 52b, with the lower section 52b extending into the sleeve 38, and the upper section 52a extending upwardly through the valve stem opening 16 and into the bonnet 22. The lower end of the upper stem section 52a is bifurcated to receive the upper end of the lower section 52b, and the two ends are pivotally interconnected by a transversely extending pin 62. Thus, the upper stem section 52a can be moved out of alignment with the valve seats 46 and 48, and the lower section 52b still be aligned with the seats, to assure a proper seating of the heads 50.

Any suitable operating mechanism may be provided in the bonnet 22 to reciprocate the valve stem 52 and move the valve heads 50 toward and away from the valve seats 46 and 48. For example, I may use a toggle 64 carried by the inner end of a transversely extending shaft 66 and connected to the upper end of the upper valve stem section 52a. The toggle 64 is constructed to reciprocate the stem 52 upon turning of the shaft 66. The shaft 66 is rotatably supported in a bushing or extension 68, and the bushing 68 is in turn secured in an aperture 70 in one side of the bonnet 22. A sealing ring 72 is preferably provided in the bushing 68 around the shaft 66. A suitable handle 74 is secured on the outer end of the shaft 66 for turning the shaft and operating the valve 4.

As previously indicated, and as will be apparent, the valve 4 is opened and closed by raising and lowering the valve heads 50. This movement, along with the action of fluid flowing through the sleeve 38, will tend to move the sleeve in the apertures 34 and 36 and vary the positions of the valve seats 46 and 48. To prevent such movement, circumferentially spaced fingers 76 extend downwardly from the bonnet 22 into contact with the flange 42. The fingers 76 are of a length to retain the flange 42 against the upper face of the upper partition 28 and anchor the sleeve 38 in a given position in the apertures 34 and 36. If desired, the fingers 76 may be made separate and secured to the bonnet 22 or between the bonnet and body flanges 20 and 18. However, I prefer to form the fingers 76 integrally with the bonnet 22 to facilitate assembly of the valve 4 and increase the rigidity of the structure.

The valve body 6, along with the partitions 28, 29 and 30, will normally be a casting, using a metal with a relatively high coefficient of expansion for economy of manufacture. Therefore, the partitions 28, 29 and 30 will have a tendency to expand and move the valve seats 46 and 48 with respect to the body when the valve 4 is used with fluids at elevated temperatures. If the valve seats are permitted to move relative to the body, the precise opening of the valve cannot be determined, with the valve element carried by the body. In the present construction, however, the fingers 76 tend to prevent upward movement of the upper partition 28 and hold the valve seats 46 and 48 in fixed positions. More specifically, if the fingers 76 are made of the same material as the body 6, the fingers 76 will tend to expand and counter-act any expansion of the upper partition 28. Then, for high temperature service, it will be necessary only to form the sleeve 38, valve seats 46 and 48, heads 50, spacer tube 56 and valve stem 52 out of a relatively expensive metal having a low coefficient of expansion.

It should also be noted that the loose, sliding, fit of the sleeve 38 in the partitions 28 and 29 eliminates the possibility of movement of the seats 46 and 48 due to twisting of the valve body 6 resulting from such causes as residual stresses, stresses induced by pipe rigidly connected to the valve, and temperature changes in the outer walls of the valve body.

When disassembling the valve 4, the bonnet 22 is removed from the valve body 6 and the stem 52 pulled upwardly. Since the lower head 50 and the lower seating ring 55 are smaller than the upper seat 46, the valve head and stem assembly is simply withdrawn from the sleeve 38 when the stem 52 is pulled up. The sleeve 38 may then be removed by simply an upward pull. When assembling the valve, the sleeve 38 is first inserted in the apertures 34 and 36. The valve head and stem assembly is then pushed into the sleeve. It may be noted that if the largest outer diameter of the lower seating ring 55 is slightly larger than the inner diameter of the upper seat 46 (as when the sizes of the valve seats 46 and 48 are made as nearly the same as possible to provide a more nearly balanced valve) the lower ring 55 may be compressed and moved through the upper seat 46 by a relatively slight downward force, whereby the valve heads 50 and stem 52 may be assembled as a unit. The re-enforced portion of the lower seating ring 55 will retain the ring in assembly on the respective head while the flexible outer portion of the ring is compressed and bent in being moved through the upper seat 46.

From the foregoing it will be apparent that the present invention facilitates the repair of balanced valves. Both the valve heads and seats may be removed without the use of special tools for replacement or repair of all working parts. It will also be apparent that the valve seats will be retained not only in a fixed position during operation of the valve, but also anchored from the same structure which carries the valve heads to assure a precise control of the valve operation. It will further be apparent that the present valve is simple in construction and may be economically manufactured.

Changes may be made in the combination and arrangement of parts or elements as heretofore set forth in the specification and shown in the drawings, it being understood that changes may be made in the precise embodiment shown without departing from the spirit and scope of the invention as defined in the following claims.

I claim:

1. A valve,
comprising a body formed from metal with a high coefficient of expansion having a main valve chamber therein and an outlet communicating with the main valve chamber, said body also having an inlet and a valve stem opening therein in spaced relation to one another and to the outlet, partitions integral with the body and extending into the main valve chamber forming a secondary valve chamber in communication with the inlet, said partitions having apertures therein at opposite sides of the secondary valve chamber in aligned relation with the valve stem opening, a sleeve formed of metal having a coefficient of expansion less than the coefficient of the body metal extending through said apertures and the secondary valve chamber and being of a size to provide a loose sliding fit in said apertures, a sealing ring in the walls of each of said apertures forming a sliding seal around the adjacent portion of the sleeve, said sleeve having an outwardly extending flange on the end thereof adjacent the valve stem opening and a plurality of ports in the medial portion thereof in communication with the secondary valve chamber, valve seats in the opposite end portions of the sleeve, a valve stem of the same metal with the coefficient of expansion of the metal of the sleeve extending through the valve stem opening and the sleeve, valve heads on the stem having metallic portions with the coefficient of expansion of the metal of the sleeve spaced to simultaneously engage said seats, a bonnet secured to the valve body around the valve stem opening, an operator carried by the bonnet and connected to the valve stem for moving said valve heads toward and away from said seats, and a hold-down structure extending from the bonnet into the main valve chamber so it contacts said flange and holds the flange against the outer face of the partition adjacent the valve stem opening.

2. A valve comprising:

a body having a main valve chamber therein and an outlet communicating with the main valve chamber, said valve also having an inlet and a valve stem opening therein in spaced relation to one another and to the outlet;

partitions extending into the main valve chamber forming a secondary valve chamber in communication with the inlet, said partitions having apertures therein at opposite sides of the secondary valve chamber in aligned relation with the valve stem opening;

a sleeve extending through said apertures in the secondary valve chamber and being of a size to slidingly fit in said apertures, said sleeve having an outwardly extending flange on the end thereof adjacent the valve stem opening and a plurality of ports in the medial portion thereof in communication with the secondary valve chamber;

a sealing ring in the walls of each of said apertures forming a sliding seal around the adjacent portion of the sleeve, valve seats in the opposite end portions of the sleeve;

a valve stem extending through the valve stem opening and the sleeve;

valve heads on the stems spaced to simultaneously engage said seats, a circumferential groove in the outer edge of the end of each valve head removed from the operator;

a seating ring in each of said grooves having its outer periphery tapered and being of a size to engage the respective seat, each of said rings being formed out of a pliable and flexible material and having a reinforcing material embedded therein inwardly of the tapered portion thereof;

a guide secured on the valve stem against the reinforced portion of each seating ring to retain the rings in their respective grooves;

a bonnet secured to the valve body around the valve stem opening;

an operator carried by the bonnet and connected to the valve stem for moving said valve heads toward and away from said seats;

and means on the bonnet extending into the main valve chamber into contact with said flange for holding said flange against the outer face of the partition adjacent the valve stem opening.

References Cited in the file of this patent

UNITED STATES PATENTS

| | | |
|---|---|---|
| 1,814,691 | Hachmeister | July 14, 1931 |
| 1,851,016 | Skelly | Mar. 29, 1932 |
| 1,872,157 | Mastenbrook | Aug. 16, 1932 |
| 1,896,947 | Glaenzer | Feb. 7, 1933 |
| 2,422,529 | Coffey | June 17, 1947 |
| 2,731,036 | Hughes | Jan. 17, 1956 |
| 2,745,631 | Shellman | May 15, 1956 |
| 2,754,840 | Hicks | July 17, 1956 |

FOREIGN PATENTS

| | | |
|---|---|---|
| 1,886 | Great Britain | Aug. 16, 1859 |
| 145,499 | Germany | Nov. 2, 1903 |